NIELS RASMUSSEN.
Improvement in Animal Traps.
No. 119,645.  Patented Oct. 3, 1871.
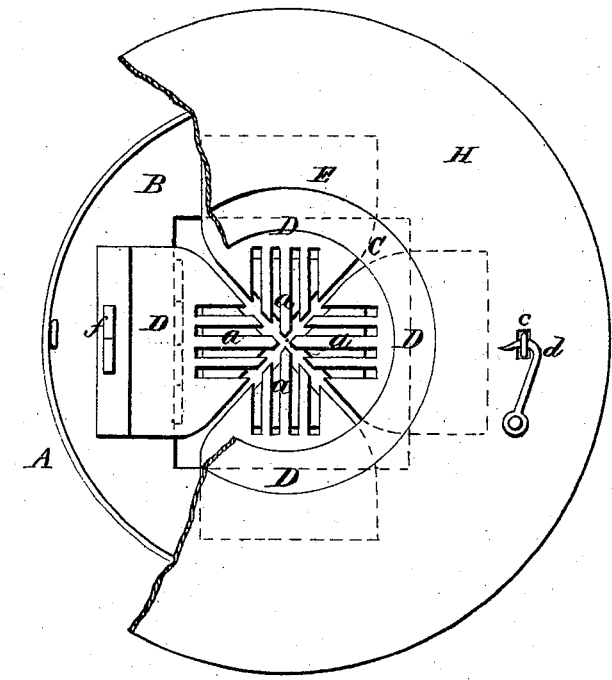
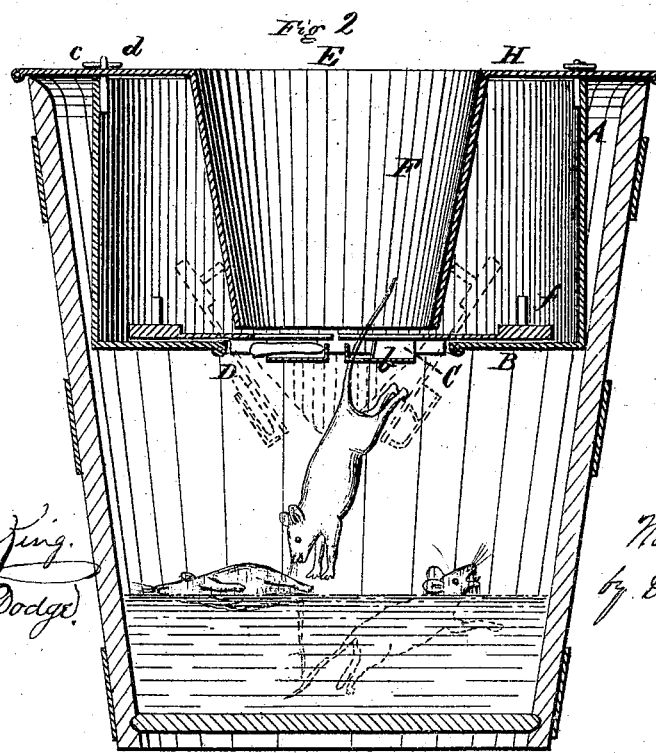
Witnesses
Harry King
Phil. T. Dodge
Inventor.
Niels Rasmussen
by Dodge & Munn
his atty's

UNITED STATES PATENT OFFICE.

NIELS RASMUSSEN, OF CHICAGO, ILLINOIS, ASSIGNOR TO HIMSELF AND WILLIAM HESSEMER, OF SAME PLACE.

IMPROVEMENT IN ANIMAL-TRAPS.

Specification forming part of Letters Patent No. 119,645, dated October 3, 1871.

*To all whom it may concern:*

Be it known that I, NIELS RASMUSSEN, of Chicago, in the county of Cook and State of Illinois, have invented certain Improvements in Animal-Traps, of which the following is a specification, reference being had to the accompanying drawing.

My invention relates to animal-traps; and consists in the novel construction and arrangement of its parts.

In the drawing, Figure 1 is a top plan view of my trap with a portion broken away to show its interior construction, and Fig. 2 is a cross-vertical section, showing its manner of operation.

In constructing this trap a cylindrical vessel, A, is made out of sheet metal or other suitable material, open at the top, and having a bottom, B, provided with a square opening, C. To the bottom B, along each side of this opening, are pivoted falls or trap-doors D, with their front ends pointed and provided with fingers $a$, forming a grating, and with their rear ends weighted. These trap-doors are arranged as clearly shown in Fig. 1, with their front ends covering the opening C, so that when anything falls upon them they will tilt, as shown in Fig. 2. To the under side of the fingers $a$ a shelf or bait-support, $b$, is attached so that when the bait is placed thereon it may be clearly seen through the finger-bars. This vessel is provided with a cover, H, having a circular opening, E, from which descends a tube, F, of the requisite length and size to reach to and surround the inner ends of the trap-doors D, as clearly shown in Fig. 2. The tube F may be made funnel-shaped so as to afford apparently more ready access to the bait. The cover, with its projecting tubular passage, F is attached by means of hooks and eyes $c$ $d$ so as to be removable readily when desired for any purpose. The trap thus constructed is suspended upon or in any convenient manner placed over a tub or barrel of water, as shown in Fig. 2. The animal, in pursuit of something to eat, noticing the bait between the finger-bars, jumps down upon them to secure it, when the doors swing and he is dropped into the water below. As the rear ends of the doors are weighted, they immediately drop back to their original position, when the trap is again ready. In order to prevent the doors from swinging over past their center a lug or projecting guard, $f$, may be attached to the upper side of their rear ends, as clearly shown in Fig. 2.

This trap is especially intended for rats, mice, and similar animals.

Having thus described my invention, what I claim is—

An animal-trap, consisting of the vessel A, cover H with tubular projection F, and trap-doors D provided with the finger-bars $a$, when constructed and arranged to operate as herein shown and described.

NIELS RASMUSSEN.

Witnesses:
 FRITZ FOLTZ,
 GEORGE POHL. (51)